United States Patent
Ando

(10) Patent No.: US 10,434,652 B2
(45) Date of Patent: Oct. 8, 2019

(54) WORKPIECE PICKING SYSTEM

(71) Applicant: Fanuc Corporation, Yamanashi (JP)

(72) Inventor: Toshiyuki Ando, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 66 days.

(21) Appl. No.: 15/925,883

(22) Filed: Mar. 20, 2018

(65) Prior Publication Data

US 2018/0333857 A1   Nov. 22, 2018

(30) Foreign Application Priority Data

May 19, 2017   (JP) .................................. 2017-100353

(51) Int. Cl.
| | |
|---|---|
| *B25J 13/08* | (2006.01) |
| *B25J 9/16* | (2006.01) |
| *G01B 21/16* | (2006.01) |

(52) U.S. Cl.
CPC .......... *B25J 9/1684* (2013.01); *B25J 9/1612* (2013.01); *B25J 9/1694* (2013.01); *B25J 9/1697* (2013.01);
(Continued)

(58) Field of Classification Search
CPC ...... B25J 9/1612; B25J 9/1684; B25J 9/1694; B25J 9/1697; B25J 13/088;
(Continued)

(56) References Cited

U.S. PATENT DOCUMENTS

| | | |
|---|---|---|
| 4,985,846 A | 1/1991 | Fallon |
| 9,156,162 B2 | 10/2015 | Suzuki et al. |

(Continued)

FOREIGN PATENT DOCUMENTS

| | | |
|---|---|---|
| DE | 102013012068 A1 | 1/2014 |
| DE | 102014212304 B4 | 5/2016 |

(Continued)

OTHER PUBLICATIONS

Japan Patent Office, Decision to Grant a Patent and Memorandum dated Jan. 29, 2019 for Japan Application No. 2017-100353.

(Continued)

*Primary Examiner* — Robert T Nguyen
(74) *Attorney, Agent, or Firm* — Winstead PC

(57) ABSTRACT

A workpiece picking system including: a robot; a hand, attached to a hand tip portion of the robot, for picking workpieces; a three-dimensional sensor, attached to the hand tip portion, for acquiring positional information of a three-dimensional point group in a partial region in a container; a workpiece state calculation unit which calculates a position and posture of a workpiece based on positional information of a three-dimensional point group in an acquired first partial region; a data acquisition position calculation unit which calculates a robot corresponding to a second partial region where positional information is to be acquired next, based on the positional information of the three-dimensional point group in the acquired first partial region; and a control unit which controls the robot and the hand based on the calculated position and posture of the workpiece and based on the calculated robot position corresponding to the second partial region.

6 Claims, 5 Drawing Sheets

(52) U.S. Cl.
CPC ............ *B25J 13/088* (2013.01); *G01B 21/16* (2013.01); *G05B 2219/39058* (2013.01); *G05B 2219/39473* (2013.01); *G05B 2219/39484* (2013.01); *G05B 2219/39527* (2013.01); *G05B 2219/40053* (2013.01)

(58) Field of Classification Search
CPC ........... G05B 2219/39058; G05B 2219/39473; G05B 2219/39484; G05B 2219/39527; G05B 2219/40053; G01B 21/16
See application file for complete search history.

(56) References Cited

U.S. PATENT DOCUMENTS

| | | |
|---|---|---|
| 2004/0117066 A1 | 6/2004 | Ban et al. |
| 2004/0122552 A1 | 6/2004 | Ban et al. |
| 2008/0240511 A1* | 10/2008 | Ban ................... B25J 9/1697 382/108 |
| 2012/0029686 A1 | 2/2012 | Ban et al. |
| 2012/0165986 A1 | 6/2012 | Fuhlbrigge et al. |
| 2012/0296474 A1 | 11/2012 | Irie et al. |
| 2013/0211593 A1* | 8/2013 | Domae ................ B25J 9/1612 700/258 |
| 2014/0031985 A1 | 1/2014 | Kumiya |
| 2014/0081452 A1 | 3/2014 | Ito et al. |
| 2014/0121836 A1 | 5/2014 | Ban |
| 2014/0365010 A1 | 12/2014 | Yasuda et al. |
| 2015/0003678 A1 | 1/2015 | Watanabe et al. |
| 2017/0173798 A1 | 6/2017 | Watanabe et al. |

FOREIGN PATENT DOCUMENTS

| | | |
|---|---|---|
| EP | 1418025 A2 | 5/2004 |
| EP | 1428634 A2 | 6/2004 |
| EP | 2345515 B1 | 4/2013 |
| EP | 2708333 A2 | 3/2014 |
| EP | 2810747 A2 | 12/2014 |
| EP | 2524776 B1 | 1/2017 |
| JP | S64-78103 A | 3/1989 |
| JP | 2000-326273 A | 11/2000 |
| JP | 2002-200588 A | 7/2002 |
| JP | 2004-160567 A | 6/2004 |
| JP | 2004-188562 A | 7/2004 |
| JP | 2010-089238 A | 4/2010 |
| JP | 2011-083882 A | 4/2011 |
| JP | 2011-188562 A | 9/2011 |
| JP | 2012-024903 A | 2/2012 |
| JP | 2012-240133 A | 12/2012 |
| JP | 2013-184279 A | 9/2013 |
| JP | 2014-058004 A | 4/2014 |
| JP | 2014-087913 A | 5/2014 |
| JP | 2014-237188 A | 12/2014 |
| JP | 2016-099257 A | 5/2016 |

OTHER PUBLICATIONS

Japan Patent Office, Search Report dated Jan. 21, 2019 for Japan Application No. 2017-100353.

* cited by examiner

WORKPIECE PICKING SYSTEM

CROSS-REFERENCE TO RELATED APPLICATIONS

This application is based on and claims priority to Japanese Patent Application No. 2017-100353 filed on May 19, 2017, the content of which is incorporated herein by reference in its entirety.

TECHNICAL FIELD

The present invention relates to a workpiece picking system.

BACKGROUND ART

Conventionally, a workpiece picking system is known which picks disorderly stored workpieces in a container by a robot (for example, see PTL 1).

In the workpiece picking system, a three-dimensional sensor is attached to a hand tip portion of a robot, the three-dimensional sensor being configured to capture an image with an entire upper opening of a container captured in a field of view, and to be able to acquire a three-dimensional point group of a workpiece in the field of view.

CITATION LIST

Patent Literature

{PTL 1} Japanese Unexamined Patent Application, Publication No. 2004-188562

SUMMARY OF INVENTION

An aspect of the present disclosure is a workpiece picking system including: a robot, a hand, attached to a hand tip portion of the robot, for picking workpieces, a three-dimensional sensor attached to the hand tip portion of the robot, for acquiring positional information of a three-dimensional point group in a partial region in a container, a workpiece state calculation unit which calculates a position and posture of a workpiece based on positional information of a three-dimensional point group in a first partial region acquired by the three-dimensional sensor, a data acquisition position calculation unit which calculates a robot position corresponding to a second partial region where positional information is to be acquired next, based on the positional information of the three-dimensional point group in the first partial region acquired by the three-dimensional sensor, and a control unit which controls the robot and the hand based on the position and the posture of the workpiece calculated by the workpiece state calculation unit and based on the robot position corresponding to the second partial region calculated by the data acquisition position calculation unit.

DESCRIPTION OF EMBODIMENTS

A workpiece picking system 1 according to an embodiment of the present invention will be described below with reference to the drawings.

Figure 1:
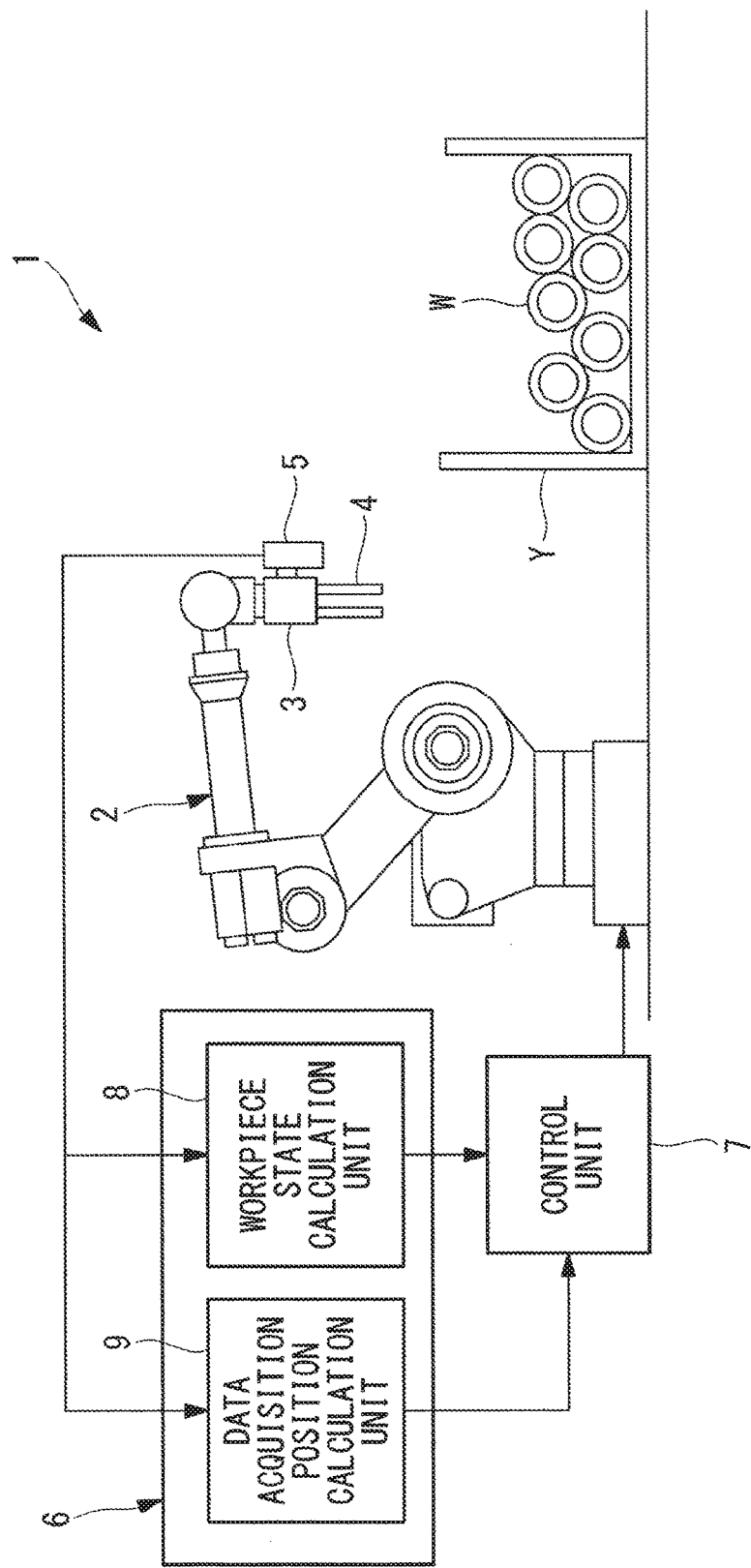
FIG. 1 is an overall configuration diagram of a workpiece picking system according to an embodiment of the present invention.

As shown in FIG. 1, the workpiece picking system 1 according to the present embodiment includes a robot 2 installed near a container Y which is for storing a plurality of workpieces W and which is open at the top, a hand 4, attached to a hand tip portion 3 of the robot 2, for gripping a workpiece W, a three-dimensional sensor 5, attached to the hand tip portion 3 of the robot 2, for acquiring three-dimensional information of a workpiece W in the container Y, an information processing unit 6 for processing the three-dimensional information acquired by the three-dimensional sensor 5, and a control unit 7 for controlling the robot 2 and the hand 4 based on a processing result of the information processing unit 6. The information processing unit 6 and the control unit 7 include a memory, not shown, for storing information, and a processor, not shown, for performing information processing.

In the example shown in FIG. 1, the robot 2 is a vertical articulated robot, but a robot of any type may be adopted.

Figure 3:
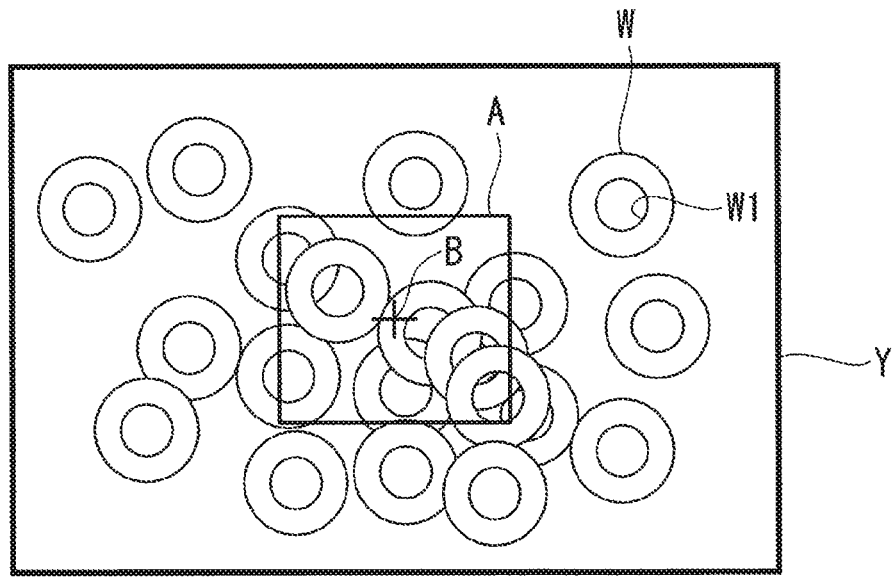
FIG. 3 is a plan view of a container storing workpieces, where a partial region where data acquisition is performed first in step S2 of the workpiece picking method in FIG. 2 is shown in an overlapping manner.

As shown in FIG. 3, the three-dimensional sensor 5 has a data acquisition range A which is smaller than a size of an upper opening of the container Y, and is configured to acquire, from an upper side, information about three-dimensional positions of a plurality of points (three-dimensional point group) on surfaces of the workpieces within the data acquisition range A among the surfaces of a plurality of disorderly stored workpieces W in the container Y, and to transmit the information to the information processing unit 6. In the drawing, a reference sign B indicates one of three-dimensional points present in the data acquisition range A.

The information processing unit 6 includes a workpiece state calculation unit 8 for recognizing, based on positional information of the three-dimensional point group transmitted from the three-dimensional sensor 5, a workpiece W present in the data acquisition range (first partial region) A, and for calculating a position and posture of the recognized workpiece W, and a data acquisition position calculation unit 9 for calculating a position of a region (second partial region) where the positional information of the three-dimensional point group is to be acquired next.

For example, the workpiece state calculation unit 8 recognizes a workpiece W by performing model matching using three-dimensional model data which is registered in advance. Furthermore, position coordinates of the recognized workpiece W are calculated based on, for example, a center of gravity position of the workpiece W, and posture of the workpiece W, such as a tilt angle and a tilt direction, is calculated based on a degree of deformation relative to the three-dimensional model data or the positional information of the three-dimensional point B on the surface of the recognized workpiece W.

Figure 5:
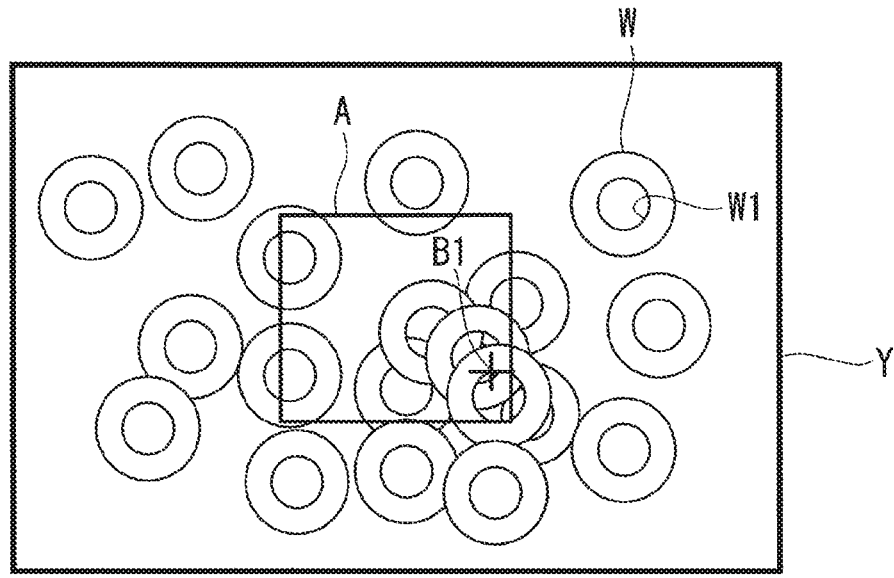
FIG. 5 is a plan view of the container storing workpieces, where a robot position, where data acquisition is to be performed next, calculated in step S8 of the workpiece picking method in FIG. 2 is shown in an overlapping manner.
Figure 6:
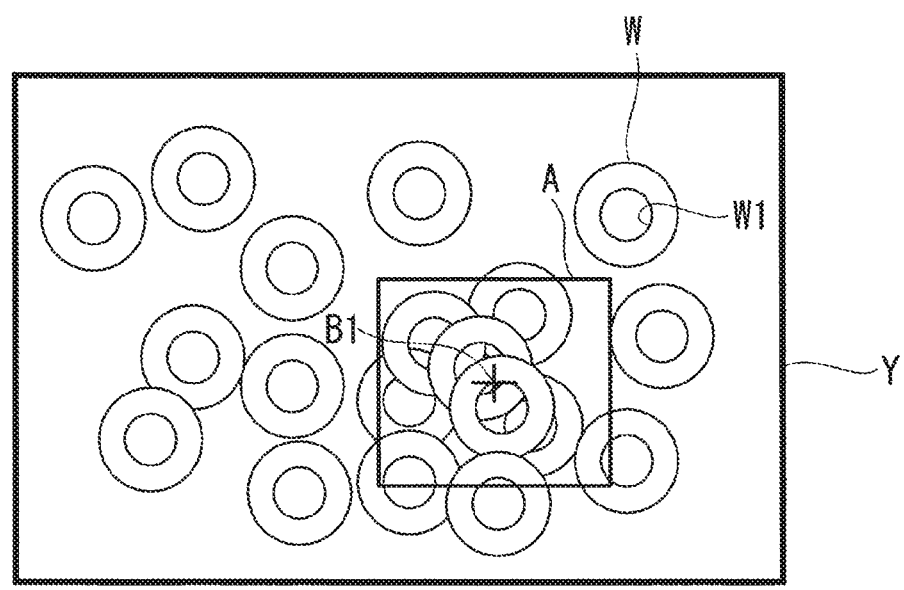
FIG. 6 is a plan view of the container storing workpieces, where a partial region where data acquisition is to be performed next in step S2 of the workpiece picking method in FIG. 2 is shown in an overlapping manner.

As shown in FIGS. 5 and 6, the data acquisition position calculation unit 9 sets, as the next data acquisition range A, a region having, at the center (reference), a three-dimensional point B1, which is located at the highest position among three-dimensional points B present in the data acquisition range A, for example. That is, the next data acquisition range (second partial region) A is a field of view range (having the three-dimensional point B1 at the center of the field of view) acquired by arranging the three-dimensional sensor 5 at a position vertically above and separated by a predetermined distance from the three-dimensional point B1, which is located at the highest position among the three-dimensional points B present in the data acquisition range A.

A function of the workpiece picking system 1 according to the present embodiment configured in the above manner will be described below.

Figure 2:
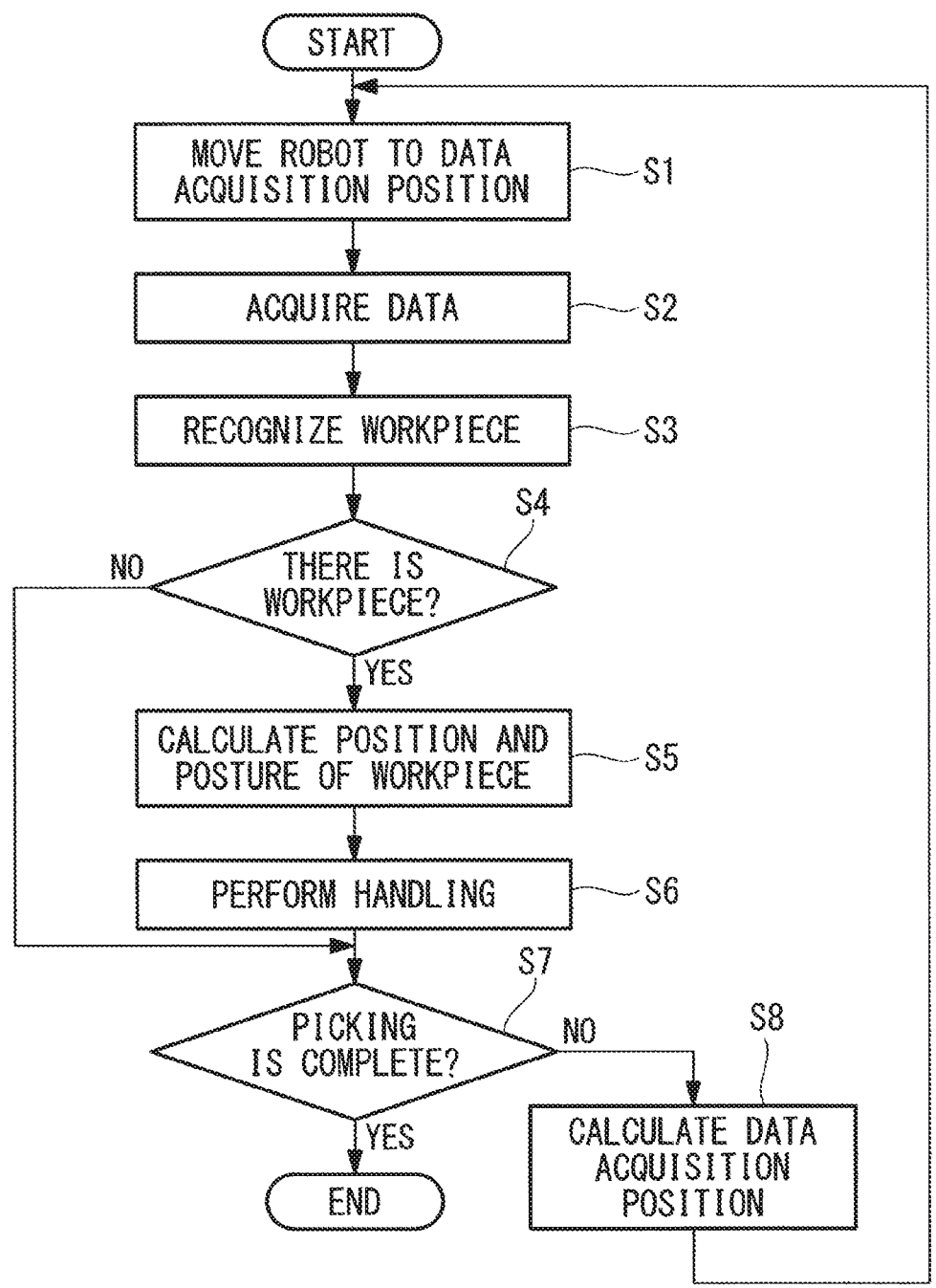
FIG. 2 is a flowchart describing a workpiece picking method of the workpiece picking system in FIG. 1.

As shown in FIG. 2, to pick disorderly stored workpieces W in the container Y by using the workpiece picking system 1 of the present embodiment, first, the robot 2 is operated to arrange the three-dimensional sensor 5 at a first data acquisition position set in advance, such as a position which takes a predetermined region at the center of the container Y as the data acquisition range A (step S1).

The three-dimensional sensor 5 is operated in this state to perform data acquisition for the data acquisition range A set in the container Y, so as to detect, and acquire position coordinates of, a plurality of three-dimensional points B on a surface of a workpiece W present in the container Y (step S2). Next, model matching is performed based on acquired three-dimensional point group and using three-dimensional model data, and recognition of the workpiece W is performed (step S3).

Figure 4:
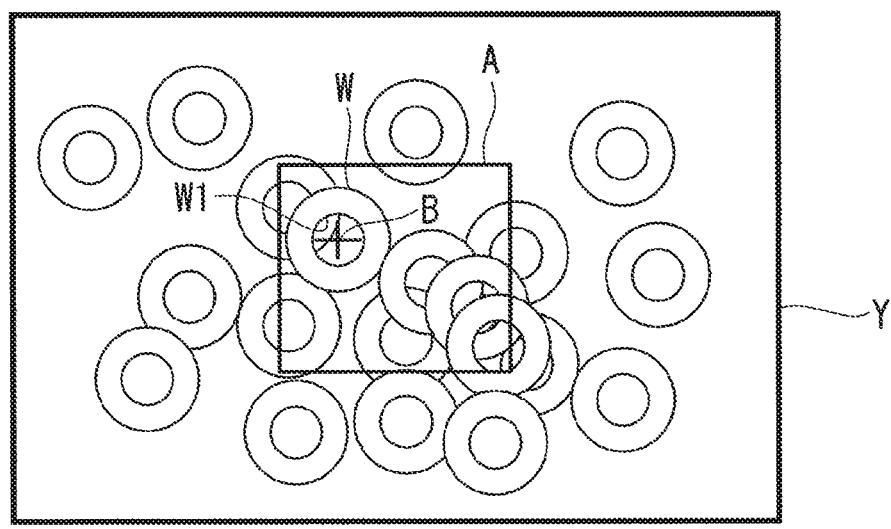
FIG. 4 is a plan view of the container storing workpieces, where a workpiece recognized in step S3 of the workpiece picking method in FIG. 2 is shown in an overlapping manner.

In the case where a workpiece W is recognized inside the data acquisition range A (step S4), the positions and postures of all the recognized workpieces W are calculated (step S5). In the example shown in FIG. 4, the workpiece W has a doughnut shape, and three-dimensional coordinates of a three-dimensional point B at the center of a center hole W1 are calculated as the position of the workpiece W, and a tilt angle and a tilt direction of the workpiece W are calculated as the posture.

The robot 2 is operated with respect to at least one workpiece W, the position and posture of which have been calculated, and the workpiece W is picked and transferred to a transfer destination one by one by the hand 4 attached to the hand tip portion 3 (step S6). When all the recognized workpieces W have been picked, whether all the workpieces W in the container Y have been picked or not is determined (step S7), and if all the workpieces W have been picked, the process is ended, and if picking is not complete, calculation of the next data acquisition position is performed (step S8).

Then, the data acquisition range A having the three-dimensional point B1, which is located at the highest position, at the center is calculated as the next data acquisition position, based on the three-dimensional point group acquired in step S2. Then, in the case where the next data acquisition position is calculated, steps are repeated from step S1.

In the case where no workpiece W is recognized in step S4, steps are performed from step S7.

As described above, with the workpiece picking system 1 according to the present embodiment, the data acquisition position of the three-dimensional sensor 5 for the positional information of the next three-dimensional point group is not determined based on a position which is taught in advance, but on the positional information of a three-dimensional point group acquired by the three-dimensional sensor 5.

Accordingly, there is an advantage that, even when the three-dimensional sensor 5 which can only partially acquire a three-dimensional point group in the container Y is mounted, unnecessary movement of the robot 2 and unnecessary acquisition of positional information of a three-dimensional point group by the three-dimensional sensor 5 may be prevented, and the workpiece W can be efficiently picked.

That is, in a case of dividing a space inside the container Y into a plurality of regions, and of performing, sequentially in each region, acquisition of positional information of a three-dimensional point group by the three-dimensional sensor 5 and recognition of the workpiece W, acquisition of the positional information and the recognition process for the workpiece W have to be performed even in a case where the workpiece W has been already picked and is no longer present, and thus, unnecessary movement of the robot 2, unnecessary acquisition of positional information of a three-dimensional point group by the three-dimensional sensor 5, and the like are performed. On the other hand, with the workpiece picking system 1 according to the present embodiment, the next data acquisition position is determined by using already acquired positional information of a three-dimensional point group, and thus, unnecessary movement of the robot 2 and unnecessary acquisition of positional information of a three-dimensional point group by the three-dimensional sensor 5 may be prevented.

Particularly, because a next data acquisition range A having the three-dimensional point B1, which is located at the highest position among the three-dimensional point group in an acquired data acquisition range A, at the center is determined, a new three-dimensional point group may be acquired with a position where the possibility of a workpiece W being present is the highest as the center, and there is an advantage that the workpiece W can be picked more efficiently.

Additionally, in the present embodiment, the data acquisition position calculation unit 9 sets the data acquisition range A at a region having, at the center, the three-dimensional point B1, which is located at the highest position among the three-dimensional point group for which the positional information is acquired in step S2, and the robot 2 is operated to arrange the three-dimensional sensor 5 at a position vertically above and separated by a predetermined distance from the three-dimensional point B1, but it is not limited this.

For example, the robot 2 may be operated to arrange the three-dimensional sensor 5 at a position at a predetermined height vertically above the three-dimensional point B1, which is located at the highest position.

Moreover, a three-dimensional point B located on a same plane may be extracted from an acquired three-dimensional point group, and a range (second partial region) having, at the center, a center of gravity position of a planar region formed by an extracted three-dimensional point group may be calculated as the next data acquisition range A. A three-dimensional point group on the same plane is assumed to be on the surface of the same workpiece W, and thus, by acquiring positional information of the three-dimensional point group in the range having the center of gravity as the center, a three-dimensional point group in a range where the possibility of a workpiece W being present is high may be acquired.

In the case where a plurality of three-dimensional point groups on a same plane are extracted, the center of gravity of a planar portion having the largest area may be set as the center of a range where the positional information of a three-dimensional point group is to be acquired next. The area of a planar portion may be easily determined by the number of three-dimensional points B forming the planar portion.

A case where the number of three-dimensional points B extracted as the three-dimensional point group on a same plane is small is a case where the area of the extracted planar portion is physically small, or a case where the area is large, but the planar portion is not orthogonal and is greatly tilted with respect to a measurement direction of the three-dimensional sensor 5, for example. Accordingly, in the case where the number of three-dimensional points B extracted as the three-dimensional point group on a same plane is at or below a predetermined threshold, the positional information of the three-dimensional point group may be acquired again by the three-dimensional sensor 5, after operating the robot 2 such that the three-dimensional sensor 5 is rotated in any of directions around a horizontal line that passes through the center of gravity of the planar portion formed by the extracted three-dimensional point group and that is along the planar portion, and changing the tilt angle of the three-dimensional sensor 5.

If, as a result, the number of three-dimensional points B forming the planar portion becomes greater than the predetermined threshold, the positional information of a three-dimensional point group acquired at the position may be used to recognize a workpiece W. If the number of three-dimensional points B forming the planar portion is reduced due to rotation, rotation in the opposite direction may be performed.

Figure 7:
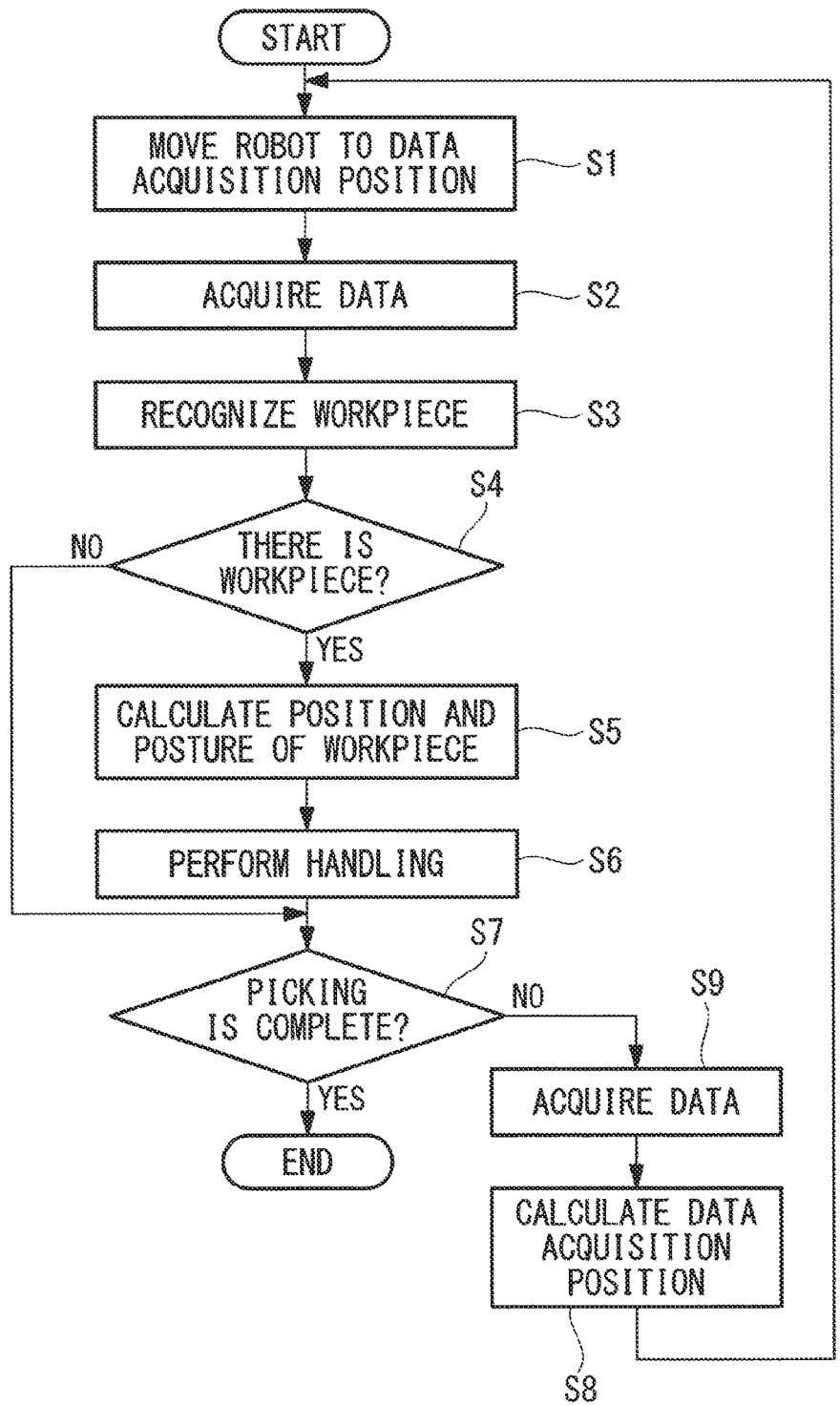
FIG. 7 is a flowchart describing a modified example of the workpiece picking method in FIG. 2.

Furthermore, in the present embodiment, a data acquisition position where the positional information of the three-dimensional point group is to be acquired next is determined by using the positional information of the three-dimensional point group acquired in step S2. Alternatively, as shown in FIG. 7, in the case where it is determined, after picking of a workpiece W, that picking of all the workpieces W in the container Y is not yet complete (step S7), the robot 2 may be moved to the first data acquisition position, and positional information of the three-dimensional point group in the same region as in step S2 may be acquired again (step S9), and the next data acquisition position may be calculated based on the newly acquired positional information of the three-dimensional point group (step S8).

That is, if the size of a picked workpiece W is large, or positions of other workpieces W are changed due to picking of one workpiece W, the positional information of the three-dimensional point group acquired in step S2 is possibly changed.

Accordingly, during transfer of a picked workpiece W, the positional information of the three-dimensional point group may be acquired again at the data acquisition position in step S2. A three-dimensional point group which enables accurate recognition of a workpiece W may thus be acquired.

From the above-described embodiments, the following aspects of the present disclosure are derived.

An aspect of the present disclosure is a workpiece picking system including: a robot, a hand, attached to a hand tip portion of the robot, for picking workpieces, a three-dimensional sensor attached to the hand tip portion of the robot, for acquiring positional information of a three-dimensional point group in a partial region in a container, a workpiece state calculation unit which calculates a position and posture of a workpiece based on positional information of a three-dimensional point group in a first partial region acquired by the three-dimensional sensor, a data acquisition position calculation unit which calculates a robot position corresponding to a second partial region where positional information is to be acquired next, based on the positional information of the three-dimensional point group in the first partial region acquired by the three-dimensional sensor, and a control unit which controls the robot and the hand based on the position and the posture of the workpiece calculated by the workpiece state calculation unit and based on the robot position corresponding to the second partial region calculated by the data acquisition position calculation unit.

According to the present aspect, when the robot is operated and the three-dimensional sensor attached to the hand tip portion is positioned with respect to the container, and positional information of a three-dimensional point group in a partial region in the container is acquired, the position and posture of a workpiece included in the three-dimensional point group in the acquired first partial region are calculated by the workpiece state calculation unit. The control unit can thereby control the robot and the hand based on the calculated position and posture of the workpiece to handle the workpiece and picking the workpiece from the container.

In this case, the robot position of the second partial region where the positional information of a workpiece is to be acquired next is calculated by the data acquisition position calculation unit based on the positional information of the three-dimensional point group in the first partial region acquired by the three-dimensional sensor.

That is, the data acquisition position of the three-dimensional sensor for the next three-dimensional point group is not determined based on a position which is taught in advance, but on the positional information of a three-dimensional point group acquired by the three-dimensional sensor, and thus, even when a three-dimensional sensor which can only partially acquire a three-dimensional point group in the container is mounted, unnecessary movement of the robot and unnecessary acquisition of positional information of a three-dimensional point group by the three-dimensional sensor may be prevented, and the workpiece can be efficiently picked.

In the aspect described above, the data acquisition position calculation unit may use, as a reference, a three-dimensional point that is located at a highest position among the three-dimensional point group in the first partial region to calculate the robot position corresponding to the second partial region.

Among disorderly stored workpieces in the container, a workpiece located at the highest position is highly likely to be a workpiece which can be most easily picked. Accordingly, by calculating the position of the second partial region where the positional information is to be acquired next, with reference to a three-dimensional point which is located at the highest position among the previously acquired three-dimensional point group, a three-dimensional point group in a second partial region where at least one workpiece can be recognized can be acquired.

Furthermore, in the aspect described above, the data acquisition position calculation unit may calculate the robot position corresponding to the second partial region in such a manner that a horizontal direction position of the three-dimensional point that is highest among the three-dimensional point group in the first partial region is positioned at a center of the second partial region, and a vertical direction position of the three-dimensional sensor becomes a predetermined height.

This allows the robot position to be easily calculated for a horizontal second partial region which coincides with a range having, at the center, the three-dimensional point located at the highest position among the three-dimensional point group in the first partial region.

Furthermore, in the aspect described above, the data acquisition position calculation unit may use, as a reference, a center of gravity position of a planar region formed by a part of the three-dimensional point group in the first partial region to calculate the robot position corresponding to the second partial region.

Because a workpiece is highly likely to be successfully picked by the robot from a part which is recognized as a planar region in the three-dimensional point group, if the center of gravity position of the planar region is used as a reference, a three-dimensional point group in a second partial region where at least one workpiece can be recognized and picked can be acquired.

Furthermore, in the aspect described above, the data acquisition position calculation unit may calculate the robot position of the second partial region in such a manner that a horizontal direction position of the center of gravity position is positioned at a center of the second partial region, and a vertical direction position of the three-dimensional sensor becomes a predetermined height.

This allows the robot position to be easily calculated for a horizontal second partial region which coincides with a range centered on the center of gravity position of the planar region in the three-dimensional point group in the first partial region.

Furthermore, in the aspect described above, in a case where the number of three-dimensional points present in the planar region is equal to or less than a predetermined threshold, the data acquisition position calculation unit may calculate the robot position corresponding to the second partial region that changes a tilt angle of the three-dimensional sensor.

When the number of three-dimensional points present in a planar region is equal to or less than a predetermined threshold, the planar region is possibly greatly tilted with respect to the three-dimensional sensor, and thus, by changing the tilt angle of the three-dimensional sensor, the robot position can be calculated for a second partial region where the three-dimensional point group may be correctly detected.

According to the aforementioned aspects, there is an advantageous effect that, even when a three-dimensional sensor which is capable of only partially acquiring positional information of a three-dimensional point group in a container is mounted, unnecessary movement of a robot and unnecessary acquisition of positional information of a three-dimensional point group by the three-dimensional sensor may be prevented, and a workpiece may be efficiently picked.

REFERENCE SIGNS LIST 1 workpiece picking system
2 robot
3 hand tip portion
4 hand
5 three-dimensional sensor
7 control unit
8 workpiece state calculation unit
9 data acquisition position calculation unit
A data acquisition range (first partial region, second partial region)
B, B1 three-dimensional point
W workpiece
Y container

The invention claimed is:

1. A workpiece picking system comprising:
a robot;
a hand attached to a hand tip portion of the robot, for picking workpieces;
a three-dimensional sensor attached to the hand tip portion of the robot, for acquiring positional information of a three-dimensional point group in a partial region in a container;
a workpiece state calculation unit which calculates a position and posture of a workpiece based on positional information of a three-dimensional point group in a first partial region acquired by the three-dimensional sensor;
a data acquisition position calculation unit which calculates a robot position corresponding to a second partial region where positional information is to be acquired next, based on the positional information of the three-dimensional point group in the first partial region acquired by the three-dimensional sensor; and
a control unit which controls the robot and the hand based on the position and the posture of the workpiece calculated by the workpiece state calculation unit and based on the robot position corresponding to the second partial region calculated by the data acquisition position calculation unit.

2. The workpiece picking system according to claim 1, wherein the data acquisition position calculation unit uses, as a reference, a three-dimensional point that is located at a highest position among the three-dimensional point group in the first partial region to calculate the robot position corresponding to the second partial region.

3. The workpiece picking system according to claim 2, wherein the data acquisition position calculation unit calculates the robot position corresponding to the second partial region in such a manner that a horizontal direction position of the three-dimensional point that is highest among the three-dimensional point group in the first partial region is positioned at a center of the second partial region, and a vertical direction position of the three-dimensional sensor becomes a predetermined height.

4. The workpiece picking system according to claim 1, wherein the data acquisition position calculation unit uses, as a reference, a center of gravity position of a planar region formed by a part of the three-dimensional point group in the first partial region to calculate the robot position corresponding to the second partial region.

5. The workpiece picking system according to claim 4, wherein the data acquisition position calculation unit calculates the robot position of the second partial region in such a manner that a horizontal direction position of a center of gravity position is positioned at a center of the second partial region, and a vertical direction position of the three-dimensional sensor becomes a predetermined height.

6. The workpiece picking system according to claim 4, wherein in a case where the number of three-dimensional points present in the planar region is equal to or less than a predetermined threshold, the data acquisition position calculation unit calculates the robot position corresponding to the second partial region after changing a tilt angle of the three-dimensional sensor.

\* \* \* \* \*